United States Patent Office 3,427,697
Patented Feb. 18, 1969

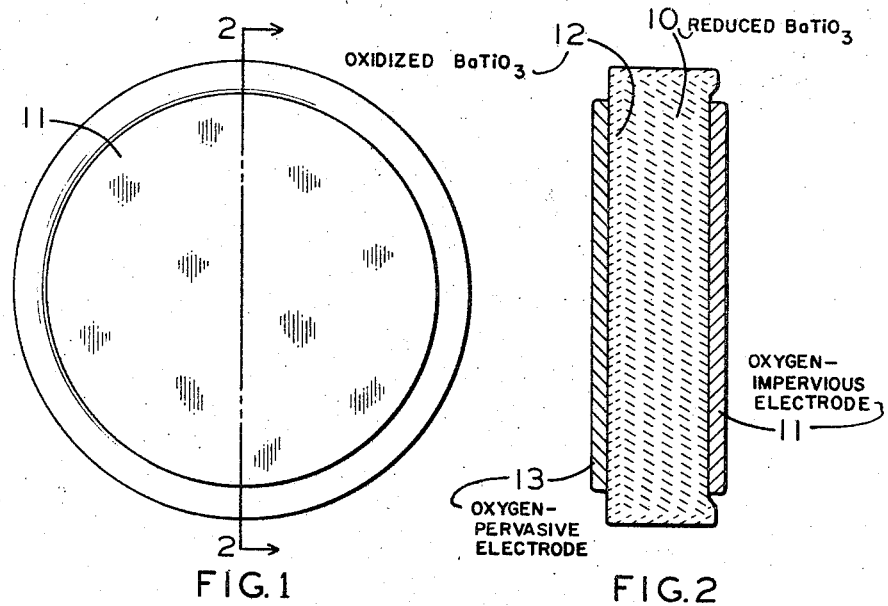
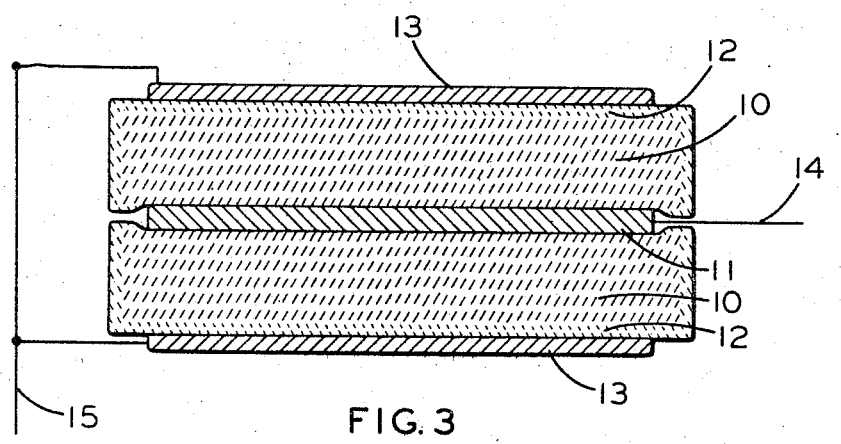

3,427,697
METHOD OF MAKING A CAPACITOR WITH AN OXYGEN PERVASIVE AND AN OXYGEN IMPERVIOUS ELECTRODE
William A. Tatem, Avon, N.Y., assignor to Sprague Electric Company, North Adams, Mass., a corporation of Massachusetts
Original application June 1, 1965, Ser. No. 465,823, now Patent No. 3,321,683, dated May 23, 1967. Divided and this application Oct. 23, 1965, Ser. No. 510,118
U.S. Cl. 29—25.42     15 Claims
Int. Cl. H01g 13/00

ABSTRACT OF THE DISCLOSURE

An electrical component is produced by applying an oxygen-pervasive counterelectrode to a reduced ceramic body which has an oxygen-impervious electrode applied thereon. Thereafter heating the unit in an oxidizing atmosphere so as to produce a thin dielectric zone beneath the oxygen-pervasive counterelectrode.

---

This application is a division of application Ser. No. 465,823 filed June 1, 1965, now U.S. Patent No. 3,321,683, issued May 23, 1967, which in turn is a continuation-in-part of abandoned application Ser. No. 248,495 filed Dec. 31, 1962. This invention is concerned with electric circuit elements and more particularly with ceramic capacitors.

It is well-known in the art to form a capacitor by (1) firing a ceramic body to maturity in air, (2) reducing this body by firing the same in a reducing atmosphere, and (3) reoxidizing the surface of the body while firing-on the silver capacitor electrodes. By the first step, the ceramic acquires the characteristics of an insulator or a dielectric; the second step results in the body exhibiting semi-conducting properties and by the third step, the surface of the semi-conducting body, including that beneath the silver electrodes, is converted to a thin insulating film.

The resulting units, therefore, consist of a semi-conducting body separating two extremely thin dielectric layers which are in intimate contact with two silver electrodes. This arrangement defines two capacitors connected in series by the semiconductor. The capacitance is about half what it would be if there were only one dielectric layer.

Several methods have been suggested for eliminating one of the dielectric layers, thereby effectively doubling the capacitance. One suggestion was to physically abrade one of the dielectric layers, and make contact through the semiconductor to the other dielectric. It was also suggested that a layer of low melting point solder be applied to one of the silver electrodes. The solder was believed to destroy the junction between the electrode and the semiconductor to the extent that the dielectric layer beneath the electrode was shorted out.

It is suggested that these methods would be time-consuming and unreliable. They, therefore, do not offer a satisfactory solution to the problem.

It is an object of the present invention to overcome the foregoing and related disadvantages.

It is another object to present a ceramic capacitor having an extremely thin dielectric and two dissimilar electrodes.

It is still another object to control the formation of the dielectric in a ceramic capacitor.

These and other objects will best be understood from the following description of the specific embodiments when read in conjunction with the accompanying drawing, in which:

FIGURE 1 is a view, in side elevation, of a ceramic capacitor according to the present invention;
FIGURE 2 is a sectional view taken on line 2—2 of FIGURE 1;
FIGURE 3 is a sectional view of two capacitors connected in parallel.

In accordance with the present invention the above objects are achieved by forming a ceramic capacitor comprising a ceramic body separating an oxygen-impervious electrode and an oxygen-pervasive counterelectrode. The surface of the ceramic body underlying or adjacent the counterelectrode is in an oxidized state and the ceramic body underlying or adjacent to the oxygen-impervious electrode is in a reduced state.

In general the process of the present invention is as follows:

A single oxygen impervious electrode is applied to a ceramic body. The body may be either in the green state or already fired to maturity. This unit is then fired in a reducing atmosphere to convert the ceramic to a semiconducting body throughout. Finally, after applying an oxygen-pervasive counterelectrode the unit is heated in an oxidizing atmosphere. The firing temperature during the final heating step in an oxidizing atmosphere must be high enough for oxygen to pervade one electrode but not high enough for it to pervade the other electrode. Moreover, the temperature must be high enough to effect oxidation of the ceramic beneath the oxygen pervasive electrode. The resulting unit is a pair of electrodes separated by a relatively thick semiconducting ceramic having a relatively thin, highly insulating layer underlying the electrode which permitted transmission of oxygen during the final heating step.

Applicant does not desire to be bound in any way by theory, however, it is believed that the principle of the present invention can be explained in the following manner. It has been determined that the noble metals and certain of their alloys are impervious to the transmission of oxygen up to some particular temperature, which is different for each metal and alloy. In the case of palladium no gas other than hydrogen can pass through the heated metal lattice until a particular threshold temperature is reached. Above this temperature, which is comparatively high, it is known that at least oxygen is also transmitted. Silver, by way of comparison, has an extremely low threshold temperature. In addition, the solubility of oxygen in silver is very high, especially at temperatures near the melting point of the metal. The solubility of oxygen under 1 atmosphere pressure at the melting point of silver is 20 volumes per volume of metal.

The other noble metals, gold, platinium, osmium, iridium, rhodium and ruthenium have so called oxygen threshold temperatures different from those of palladium and silver.

The threshold temperature of silver is so low and its ability to dissolve oxygen is so great that it stands apart from the other noble metals as far as the purposes of the present invention are concerned. Thus, silver will always be an oxygen-pervasive electrode.

As used herein the term "oxygen-pervasive electrode" means an electrode having the property of permitting oxygen to pervade it and be transmitted thereby at a temperature sufficiently high to effect oxidation of a reduced ceramic within a reasonable time.

The term "oxygen-impervious electrode" means an electrode having the characteristic of being impervious to oxygen at temperatures at which its counterelectrode would be oxygen-pervasive.

The threshold temperatures for the electrodes of the present invention cannot be stated with exact precision because certain variables influence the rate of oxygen transmission. For example, the electrode thickness, if anywhere in the region of 5 mils, will not transmit any sensible quantity of oxygen within a reasonable length of time. Thus, the present invention will only be concerned with electrode thicknesses of up to about 1 mil. Moreover, the oxygen pressure must be high enough to oxidize a reduced ceramic within a reasonable length of time for commercial units.

Keeping such limitations in mind, the following are the respective oxygen threshold temperatures for the platinum group metals and gold. Clearly above these temperatures the electrodes would transmit oxygen.

|    | ° F. |
|----|------|
| Pt | 1100 |
| Au | 1650 |
| Os | 1650 |
| Pd | 1900 |
| Ir | 2050 |
| Rh | 2550 |
| Ru | 2800 |

Referring to the drawing, FIGURE 1 shows a ceramic disc capacitor of the present invention and FIGURE 2 shows a sectional view taken on the line 2—2 of FIGURE 1. In the drawing, 10 represents the reduced, semiconducting region of the ceramic, 11 the oxygen impervious electrode, 12 the oxidized dielectric layer and 13 the oxygen-pervasive counterelectrode.

Capacitors made according to this invention are described in the following examples.

Example I.—(Oxygen-impervious electrode is palladium)

Nine green barium titanate discs of about ¼" diameter and about 30 mils thick were prepared. A thin film of a palladium paint was applied to one side of discs 1, 2 and 3 and to both sides of discs 4, 5 and 6. No electrodes were applied to discs 7, 8 and 9 until later in the process. The nine discs were then fired to maturity in air at a temperature of about 2410° F. for a period of about 1¼ hour. At this stage the ceramic discs had the properties of a dielectric. The discs were then reduced in hydrogen at a temperature of about 2240° F. for a period of about 1 hour. Extreme care was exercised to avoid exposing the palladium to hydrogen below about 950° F. It has been determined that if there is exposure at certain temperatures below this, the palladium electrode will not adhere to the ceramic surface. At this stage in the process, the reduced discs exhibited semiconducting characteristics throughout. After cooling, a silver electrode paint was applied to all the barren faces of the discs. The nine units were then fired in air at a temperature of about 1450° F. for a period of about 18 minutes.

Thereafter the units were aged for about 24 hours and then checked for capacitance and dissipation factor at 1 kc., 25° C. and 0.5 v. RMS.

The following table is a summary of the pertinent data obtained.

| Disc | Electrodes | Capacitance ($\mu\mu f.$) | D.F. (percent) | Electrode Area (in.$^2$) | Capacitance Area ($\mu f./in.^2$) |
|------|------------|---------------------------|----------------|---------------------------|------------------------------------|
| 1    | Pd/Ag      | 42,860                    | 5.9            | 0.0831                    | 0.516                              |
| 2    | Pd/Ag      | 40,490                    | 5.7            | 0.0825                    | 0.491                              |
| 3    | Pd/Ag      | 42,610                    | 5.7            | 0.0833                    | 0.512                              |
| 4    | Pd/Pd      | *short                    |                |                           |                                    |
| 5    | Pd/Pd      | *short                    |                |                           |                                    |
| 6    | Pd/Pd      | *short                    |                |                           |                                    |
| 7    | Ag/Ag      | 23,560                    | 4.6            | 0.0829                    | 0.284                              |
| 8    | Ag/Ag      | 19,500                    | 4.7            | 0.0829                    | 0.235                              |
| 9    | Ag/Ag      | 19,670                    | 5.0            | 0.0831                    | 0.237                              |

*The approximate resistance of units 4, 5 and 6 is less than 10 ohms.
Average capacitance/Area ($\mu f./in.^2$) of Ag/Pd=0.506.
Average capacitance/Area ($\mu f./in.^2$) of Ag/Ag=0.252.

Ratio of $\frac{Ag/Pd}{Ag/Ag}=2.0$

It will be noted in the preceding example that the palladium electrode would not permit oxygen transmission at the reoxidation temperature of 1450° F. since this is considerably below its threshold temperature of about 1900° F.

Example II.—(Oxygen-impervious electrode is platinum)

A plurality of green barium titanate discs of about ½" diameter and 20–30 mils thick were prepared. A thin film less than 1 mil thick, of platinum paint was applied to one side of 7 discs. A thin film of the same thickness of platinum was applied to both sides of 8 discs. About 12 discs had no electrodes applied thereto. These discs were fired to maturity in air at a temperature of about 2400° F. for a period of about 1 hour. At this stage the ceramic discs had the properties of a dielectric. Thereafter, the discs were reduced in hydrogen at a temperature of about 2300° F. for 1 hour and cooled in the absence of oxygen until danger of oxidation of the electrodes and ceramic was past. One representative disc of each group was selected. A thin film of silver paint was applied to the barren face of the disc having one platinum electrode fired thereon. A thin film of silver paint was applied to each of the barren faces of the nonelectroded disc. The three representative discs were then fired in air at a temperature of about 1000° F. for about 18 minutes.

Thereafter the units were aged for about 24 hours and then checked for capacitance and dissipation factor at 1 kc. 25° C. and 0.5 v. RMS. The electrode areas were approximately equal.

| Electrodes | Capacitance ($\mu\mu f.$) | D.F. (percent) |
|------------|---------------------------|----------------|
| Pt/Ag      | 381,000                   | 21.5           |
| Ag/Ag      | 199,400                   | 11.7           |
| Pt/Pt      | short                     |                |

Capacitance ratio $\frac{Pt/Ag}{Ag/Ag}=1.91.$

The approximate resistance of the Pt/Pt unit was less than 10 ohms.

It will be noted that the platinum electrode would not permit oxygen transmission at the final oxidation temperature of 1000° F. since this is below its threshold temperature of about 1100° F.

FIGURE 3 of the drawing illustrates another embodiment of the present invention. Here, the palladium electrode 11 is sandwiched between two titanate layers and two silver counterelectrodes 13 which are connected through a common lead-wire 15. The titanate layers 10, including the surface thereof adjacent to the palladium electrode 11 is in a reduced state and has the properties of a semiconductor. The surfaces 12 underlying or adjacent to the silver electrodes 13, are in an oxidized state and have the properties of an insulator. Lead-wire 14 is attached to the palladium electrode. The counterelectrodes 13 can be placed in electrical communication by any convenient means. For example, instead of using a common lead-wire, a continuous counterelectrode bridging the unit can be employed. This can be applied by spraying, dipping, etc.

Units such as those illustrated by FIGURE 3 can be formed by combining two of the units of FIGURE 2 so that the palladium electrodes are placed in electrical communication with one another. This can be accomplished by fusing the two together, bonding them by use of a conductive paste, etc.

The following process may also be employed:

Example III

A thin film of palladium electrode paint is sandwiched between two green barium titanate layers and this body is fired to maturity in air at a temperature of about 2410° F. for a period of about 1¼ hours. Taking care not to expose the palladium to hydrogen at a temperature below about 950° F., this unit is then reduced in hydrogen at a temperature of about 2240° F. for a period of about 1 hour. After cooling, a silver electrode paint is applied to opposite sides of the unit. This is then fired in air at a temperature of about 1450° F. for about 15 minutes. An electrode is affixed to the palladium electrode and a common lead-wire is connected to the two silver electrodes. Units such as these will have about four times the capacitance of a silver-silver electroded ceramic capacitor of the same electrode area.

It will be understood that theother noble metals can be employed as were platinum and palladium in the preceding examples, taking into consideration the particular threshold temperature of the electrode material selected. It will also be appreciated that silver can be replaced as the oxygen-pervasive electrode by using, for example, platinum with ruthenium or with any other of the metals having a higher threshold temperature than platinum. Likewise, gold or osmium may be the oxygen-pervasive electrode with any of the other metals having a higher threshold temperature being the oxygen-impervious electrode.

The noble metal selected to be the oxygen-impervious electrode must be free of any material which would give up oxygen or which would permit the diffusion of oxygen through this electrode during the reoxidation or final oxidation step. It is to be understood, however, that the electrode need not be 100% pure noble metal. Certain alloys impervious to oxygen can be employed with advantage. For example, palladium alloyed with up to about 30% by weight of silver yields an extremely durable electrode which is still impervious to oxygen below about the threshold temperature of pure palladium. Thus, the noble metals may be alloyed with other metals so long as the resulting alloy will still be effective as an oxygen-impervious electrode at temperatures which the counterelectrode is oxygen-pervasive. As in Example I with respect to palladium, the oxygen-impervious alloys of palladium also should not be exposed to hydrogen below about 950° F.

The counterelectrode, on the other hand, can be any electrode material has the essential properties of good conductivity and which also will permit oxygen to pervade it. In addition to silver, and the various noble metal combinations disclosed, certain materials can be added to the noble metals which will permit the transmission of oxygen at a temperature lower than the threshold temperature of the pure metal. For instance, one commercial palladium paint contains a glass frit. These materials, e.g. glass frit, permit a reduced ceramic surface adjacent such an electrode to be oxidized either by allowing oxygen to pass through or by giving up oxygen. Thus, materials such as glass frit may be added to any electrode which tends to inhibit the passage of oxygen in order to convert it to a more effective counterelectrode.

The electrode materials may originate from any convenient percursor, for example, a paste, paint, organometallic resinates, etc. It may be applied in any suitable manner, e.g. painting, evaporative deposition, screening, etc.

The ceramic compositions contemplated for use herein include broadly the titanates including, the alkaline earth metal titanates, particularly barium titanates and modified barium titanates. The compositions may contain any of the prior art additives designed to improve the electrical or physical characteristics of the ceramic. Examples of such additives are excess titania, niobium oxide, niobates, zirconates, stannates, etc.

The oxidizing atmosphere can be air, oxygen or any other gas mixture which will result in oxidation. The reducing atmosphere can be hydrogen, carbon monoxide, "forming gas" (80% nitrogen 20% hydrogen) or any oter gas or mixture or means, such as a vacuum, which can effect reduction.

The process limitations are quite flexible so long as firing to maturity, reduction and surface oxidation adjacent to the counterelectrode are obtained. Firing to maturity and reduction can be accomplished simultaneously or sequentially depending upon which conditions favor firm electrode adherence to the ceramic body for the particular electrode combination employed. Firing to maturity can be obtained at a temperature between about 1800° F. to about 2900° F. for from about 15 minutes to about 3 hours in either an oxidizing or a reducing atmosphere. If the body is fired to maturity in an oxidizing atmosphere first, then this must be followed by firing the unit in a reducing atmosphere until the ceramic body has the characteristics of a semiconductor throughout.

The final oxidation temperature depends upon the nature of the particular counterelectrode employed and the threshold temperature of both this electrode and that of the oxygen-impervious electrode. If silver is employed, the final oxidation temperature must be below the melting point of this metal, i.e. about 1760° F. A practical limit for this oxidation step is from about 1000° F. to about 2900° F. for a period of about 1 minute to about 30 minutes. When a high melting point oxygen-pervasive electrode is employed it may be applied at the same time the oxygen-impervious electrode is applied.

The electrical circuit elements described may be in any convenient shape, e.g. disc shape, as shown, square, rectangular, tubular, etc. In addition to their utility as capacitors the subject elements may be employed as diodes or thermistors.

As is evident from the foregoing, the invention is not to be limited to formation of the rather specific illustrative devices. Modifications and variation as well as the substitution of equivalents may be made without departing from the spirit of the invention as defined in the appended claims.

What is claimed is:

1. The method of making an electrical component comprising applying an oxygen-pervasive counterelectrode to a reduced ceramic body, said body consisting essentially of an alkaline earth metal titanate having semiconductive characteristics throughout and having an oxygen-impervious electrode previously applied thereto, and thereafter heating the unit in an oxidizing atmosphere so as to convert the surface of said body underlying said oxygen-pervasive counterelectrode to an oxidized state having the characteristics of an insulator.

2. The method of claim 1 wherein said oxygen-impervious electrode is selected from the group consisting of the platinum group metals, gold and their oxygen-impervious alloys.

3. The method of making an electrical component comprising forming a green body consisting essentially of an alkaline earth metal titanate, applying a single oxygen-impervious electrode thereto, firing said body to maturity in an oxidizing atmosphere so as to impart to said body the characteristics of an insulator throughout, reducing this unit in a reducing atmosphere so as to impart to said body the characteristics of a semiconductor throughout; and heating the unit in an oxidizing atmosphere after having applied thereto an oxygen-pervasive counterelectrode so as to convert the surface of said body underlying said counterelectrode to an oxidized state having the characteristics of an insulator.

4. The method of making an electrical component comprising forming a mature ceramic body consisting essentially of an alkaline earth metal titanate, applying an oxygen-impervious electrode thereto, reducing this unit in a reducing atmosphere so as to impart to said body the characteristics of a semiconductor throughout; and heating the unit in an oxidizing atmosphere after having applied thereto an oxygen-pervasive counterelectrode so as to convert the surface of said body underlying said counterelectrode to an oxidized state having the characteristics of an insulator.

5. The method of making an electrical component comprising applying an oxygen-impervious electrode to a green body consisting essentially of an alkaline earth metal titanate, firing said body to maturity in a reducing atmosphere so as to impart to said body the characteristics of a semiconductor throughout; and heating this unit in an oxidizing atmosphere after having applied thereto an oxygen-pervasive counterelectrode so as to convert the surface of said body underlying said counterelectrode to an oxidized state having the characteristics of an insulator.

6. The method of making a capacitor comprising forming a green body consisting essentially of an alkaline earth metal titanate, applying thereto an electrode selected from the group consisting of palladium and its oxygen-impervious alloys, firing this unit to maturity in an oxidizing atmosphere so as to impart to said body the characteristics of an insulator throughout; reducing this unit in hydrogen, taking care not to expose the unit to hydrogen at a temperature below about 950° F., said reducing being sufficient to impart to said body the characteristics of a semiconductor throughout, applying a silver counterelectrode thereto, and heating the unit in an oxidizing atmosphere so as to convert the surface of said body underlying said counterelectrode to an oxidized state having the characteristics of an insulator.

7. The method of making a capacitor comprising, forming a green body consisting essentially of an alkaline earth metal titanate, applying thereto an electrode of palladium alloyed with from 0 to 30% by weight of silver, firing this unit to maturity in an oxidizing atmosphere so as to impart to said body the characteristics of an insulator throughout, reducing this unit in hydrogen, taking care not to expose the unit to hydrogen at a temperature below about 950° F., said reducing being sufficient to impart to said body the characteristics of a semiconductor throughout; applying a silver counterelectrode thereto, and subjecting said unit to an oxidizing atmosphere at a temperature below about 1760° F. so as to convert the surface of said body underlying said counterelectrode to an oxidized state having the characteristics of an insulator.

8. The method of making a capacitor comprising applying an oxygen-pervasive counterelectrode to a reduced ceramic body having an oxygen-impervious electrode applied thereto, said body consisting essentially of an alkaline earth metal titanate having semiconductive characteristics throughout, and thereafter heating the unit in an oxidizing atmosphere between about 1000° F. to about 2900° F. for a period of about 1 minute to about 30 minutes so as to convert the surface of said body underlying said oxygen-pervasive counterelectrode to an oxidized state having the characteristics of an insulator.

9. The method of making a capacitor comprising, forming a green titanate body, applying thereto a palladium electrode, firing this unit to maturity at a temperature between about 2200° F. and about 2900° F. in an oxidizing atmosphere, reducing said unit in hydrogen at a temperature between about 1800° F. and about 2300° F. taking care not to expose the unit to hydrogen at a temperature below 950° F., applying a silver counterelectrode and subjecting the unit to an oxidizing atmosphere at a temperature below 1760° F.

10. The method of making a capacitor comprising sandwiching an oxygen-impervious electrode between two green layers said layers consisting essentially of an alkaline earth metal titanate, firing this unit to maturity in an oxidizing atmosphere so as to impart to said layers the characteristics of an insulator throughout, reducing said unit in a reducing atmosphere so as to impart to said layers the characteristics of a semiconductor throughout, heating the unit in an oxidizing atmosphere after having applied oxygen-pervasive counterelectrodes to opposite surfaces of said layers, said counterelectrodes being placed in electrical communication with one another, said heating being sufficient to convert the surface of said layers underlying said counterelectrodes to an oxidized state having the characteristics of an insulator.

11. The method of claim 10 wherein said oxygen-impervious electrode is selected from the group consisting of the platinum group metals, gold and their oxygen-impervious alloys.

12. The method of making a capacitor comprising sandwiching an oxygen-impervious electrode between two green layers, said layers consisting essentially of an alkaline earth metal titanate, firing this unit to maturity in a reducing atmosphere so as to impart to said layers the characteristics of a semiconductor throughout; heating the unit in an oxidizing atmosphere after having applied oxygen-pervasive counterelectrodes to opposite surfaces of said layers, said counterelectrodes being placed in electrical communication with one another said heating being sufficient to convert the surface of said layers underlying said counterelectrodes to an oxidized state having the characteristics of an insulator.

13. The method of making a capacitor comprising sandwiching an electrode selected from the group consisting of palladium and its oxygen-impervious alloys between two green layers said layers consisting essentially of an alkaline earth metal titanate, firing this unit to maturity in an oxidizing atmosphere so as to impart to said layers the characteristics of an insulator throughout, reducing said unit in hydrogen, taking care not to expose the unit to hydrogen at a temperature below about 950° F., said reducing being sufficient to impart to said layers the characteristics of a semiconductor throughout, applying silver counterelectrodes to opposite surfaces of the titanate layers, said counterelectrodes being in electrical communication with one another, subjecting this unit to an oxidizing atmosphere at a temperature below about 1760° F. so as to convert the surface of said layers underlying said counterelectrode to an oxidized state having the characteristics of an insulator.

14. The method of making a capacitor comprising sandwiching an electrode of palladium alloyed with from 0 to about 30% by weight of silver between two green layers said layers consisting essentially of an alkaline earth metal titanate, firing this unit to maturity in an oxidizing atmosphere so as to impart to said layers the characteristics of an insulator throughout, reducing said unit in hydrogen, taking care not to expose the unit to hydrogen at a temperature below about 950° F., said reducing being sufficient to impart to said body the characteristics of a semiconductor throughout, applying silver counterelectrodes to opposite surfaces of the titanate layers, said counterelectrodes being in electrical communication with one another, subjecting this unit to an oxidizing atmosphere at a temperature below about 1760° F. so as to convert the surface of said layers underlying said counterelectrodes to an oxidized state having the characteristics of an insulator.

15. The method of making a capacitor comprising sandwiching a palladium electrode between two green titanate layers, firing this unit to maturity in an oxidizing atmosphere at a temperature between about 1800° F. and about 2900° F., taking care not to expose the unit to hydrogen at a temperature below 950° F., applying silver counterelectrodes to opposite surfaces of the titanate layers, said counterelectrodes being in electrical communication with one another, subjecting this unit to an oxidizing atmosphere at a temperature below about 1760° F.

References Cited

UNITED STATES PATENTS

| | | | |
|---|---|---|---|
| 2,899,345 | 8/1959 | Oshry | 317—258 |
| 3,133,338 | 5/1964 | Fabricius et al. | 29—25.42 |
| 3,160,944 | 12/1964 | Hill et al. | 29—25.42 |

JOHN F. CAMPBELL, *Primary Examiner.*

RICHARD B. LAZARUS, *Assistant Examiner.*